(No Model.)
F. WALKER.
AUTOMATIC FLUSHING APPARATUS.
No. 525,244. Patented Aug. 28, 1894.
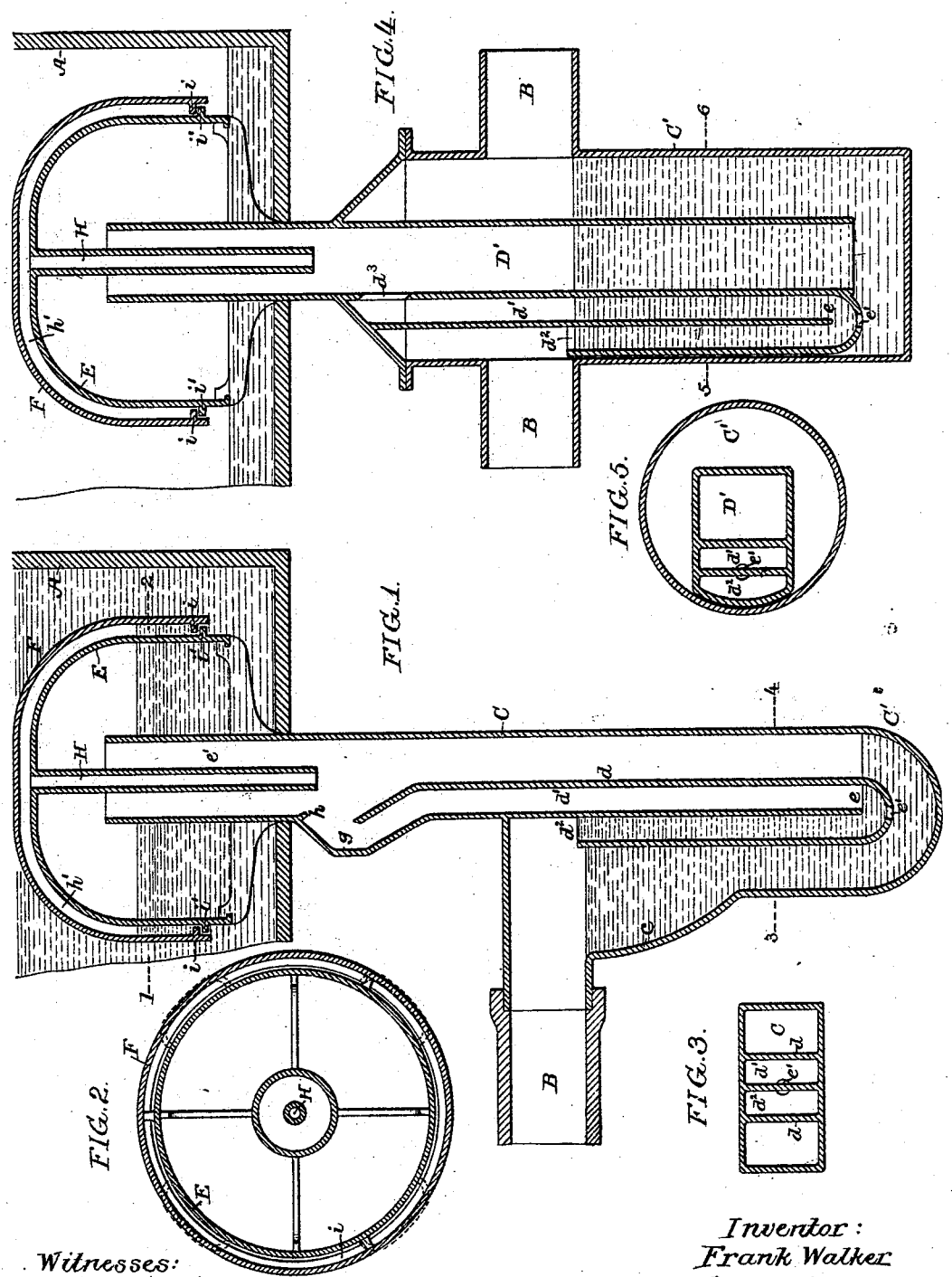
Witnesses:
R. Schleicher.
A. V. Groupe
Inventor:
Frank Walker
by his Attorneys
Howson & Howson

UNITED STATES PATENT OFFICE.

FRANK WALKER, OF LOS ANGELES, CALIFORNIA.

AUTOMATIC FLUSHING APPARATUS.

SPECIFICATION forming part of Letters Patent No. 525,244, dated August 28, 1894.

Application filed January 31, 1893. Serial No. 460,194. (No model.)

*To all whom it may concern:*

Be it known that I, FRANK WALKER, a citizen of the United States, and a resident of Los Angeles, Los Angeles county, California, have invented certain Improvements in Automatic Flushing Apparatus, of which the following is a specification.

My invention relates to siphon flushing devices such as are used for the periodical flushing of drain pipes, water closets, sewers, &c., the object of the invention being to construct a siphon of a simple and effective character, and the special features of the invention being fully set forth and specifically claimed hereinafter.

In the accompanying drawings:—Figure 1, is a sectional view of a siphon flushing device constructed in accordance with my invention. Fig. 2, is a sectional plan view of the same on the line 1—2, Fig. 1. Fig. 3, is a sectional plan view on the line 3—4, Fig. 1. Fig. 4, is a sectional view similar to Fig. 1, but illustrating a modified construction; and Fig. 5, is a sectional plan view on the line 5—6, Fig. 4.

A represents a tank or receptacle which receives a continuous supply of water, B the outlet pipe leading to the drain pipe or other device to be flushed and communicating with the tank A through a pipe C trapped at C′, the uptake of the trap having an enlarged discharge end $c$ where it connects with the outlet pipe B. In the pipe C, which forms the longer leg of a siphon, is a partition $d$ forming an air vent passage $d'$, $d^2$ trapped at $e$ and communicating at its lowest point with the main trap C′ through an opening $e'$. The discharge end $d^2$ of the vent passage is on a slightly higher level than the discharge of the main trap and is so arranged as to discharge its contents into the enlarged portion $c$ of the trap C′, while the passage $d'$ terminates at a point in the upper portion of the pipe C and is preferably arranged as shown in Fig. 1, the pipe C having an offset $g$ and the upper end of the partition plate $d$ being bent over so that the mouth of the vent will be to one side of the downward flow of water during the siphon action. To further prevent the flow of water into the mouth of the vent tube, I provide a deflector plate or ledge $h$ at the junction of the offset and the main pipe C, as shown. The short or intake leg of the siphon is formed by a dome E which extends above the mouth of the pipe C, its lower edge terminating at a short distance from the bottom of the tank. Surmounting the main dome E is a second dome F suitably supported by said dome E, but at a short distance therefrom so as to form between the two domes a chamber $h'$, or instead of this outer dome there may be one or more passages such as shown for instance by dotted lines in Fig. 2. The lower edge of the upper dome terminates at a point a slight distance above the lower edge of the dome E and the entrance to the chamber $h'$ between the domes is contracted to a considerable extent by the use of circular ribs $i$ $i'$ overlapping each other, and permitting the water to enter slowly between them, but, at the same time, preventing, to a considerable extent, the entrance of foreign matters, which might interfere with the proper working of the apparatus. Projecting downwardly from the upper portion of the dome E and communicating with the chamber $h'$ between the domes is a tube H, the lower end of which terminates in the pipe C at a point some distance below the lower edge of the dome E.

The operation of the device is as follows: As shown in Fig. 1, the siphon action is just about to commence, the water in the tank A having accumulated to such an extent as to rise beneath the dome E and in the chamber $h'$ between the domes, thus compressing the air contained within the dome E, chamber $h'$, discharge pipe C and vent passage $d'$. As the water accumulates in the tank A, this compression of air will gradually force the water contained in the trap $e$ to or about the level shown in Fig. 1, the surplus water flowing out from the passage $d^2$ into the enlarged chamber $c$ of the trap C′. As the water in the tank continues to rise, the air will force its way through the vent passage $d^2$, thus suddenly lessening the back pressure in the dome E and permitting the water to rise very rapidly within the same and overflow into the pipe C constituting the longer leg of the siphon, thereby starting the discharge of the water from the tank. As soon as the pressure of air is relieved in the pipe C the water contained in the chamber c (which has been augmented by the addition of the water from the passage $d^2$) will rise in the pipe C and meet the down flow of water, the whole then flowing out through the discharge pipe B. This action continues until the water has been exhausted from the tank A to a point below the level of the lower edge of the dome E when the entrance of air to the dome E and through the pipe H breaks the flow of water and the siphon action ceases. The water contained in the chamber $h'$ gradually drains out from between the domes after the level in the tank A has fallen below the edge of the dome F, thus preventing any air from entering in the pipe C until the water is drawn down to the bottom of the dome E. After the siphon action is broken, the water in the trap C' assumes its normal level, the water flowing into the trap e of the vent passage through the opening $e'$ until the water in both traps assumes the same level.

In the modification shown in Figs. 4 and 5, I have illustrated the application of the device to the flushing of two pipes B B', and the main pipe D' extends in a direct vertical line to near the lower end of a chamber C' which forms the up-take of the trap and with which the pipes B B' communicate. In this case the vent passages $d'$, $d^2$ are placed on one side of the pipe D', the vent tube $d'$ communicating with said pipe D' through an opening $d^3$. The action in this case is precisely the same as that previously described with reference to Fig. 1, the water level shown in Fig. 4 being that which is assumed after each action of the siphon ceases.

In constructing the siphon shown in Fig. 1 I have formed the vent tubes integral with the discharge pipe C and the trap C' and in all cases I prefer to arrange the vent passages to some extent within the longer leg of the siphon so that in the event of leakage of air there will be little or no danger of the failure of the siphon action.

Having thus described my invention, I claim and desire to secure by Letters Patent—

1. The combination, in a flushing device, of the tank, a siphon discharge pipe, a vent passage within the same, a dome forming the short leg of the siphon, a supplementary dome surmounting said main dome and forming between the two a passage having a contracted outlet, and a vent pipe forming a communication between said passage and the siphon pipe, substantially as specified.

2. The combination, in a flushing device, of a tank, a trapped siphon pipe, a contracted air vent passage having a trap communicating at the bottom with that of the main siphon pipe, and a discharge pipe leading from said main trap, substantially as specified.

In testimony whereof I have signed my name to this specification in the presence of two subscribing witnesses.

FRANK WALKER.

Witnesses:
LEE D. CRAIG,
FRANK P. PRAY.